United States Patent [19]
Noble et al.

[11] Patent Number: 5,586,204
[45] Date of Patent: Dec. 17, 1996

[54] INTEGRITY CHECKING PROCEDURE FOR HIGH THROUGHPUT DATA TRANSFORMATIONS

[75] Inventors: William B. Noble, Santa Monica; Thomas W. Bradley, Newbery Park; Michael W. Autry, Woodland Hills, all of Calif.

[73] Assignee: Hughes Electronics, Los Angeles, Calif.

[21] Appl. No.: 269,422

[22] Filed: Jun. 30, 1994

[51] Int. Cl.$^6$ ............... G06K 9/20; G06K 9/36
[52] U.S. Cl. ............ 382/282; 382/309; 371/68.1; 371/71
[58] Field of Search ............... 382/149, 238, 382/240, 248, 249, 250, 276, 277, 282, 302, 304, 307, 309; 395/182.04, 184.01; 371/71, 68.1, 68.3

[56] References Cited

U.S. PATENT DOCUMENTS

| | | | |
|---|---|---|---|
| 4,614,430 | 9/1986 | Hara et al. | 382/149 |
| 4,698,785 | 10/1987 | Desmond et al. | 371/71 |
| 4,750,181 | 6/1988 | McDonald et al. | 371/71 |
| 5,050,230 | 9/1991 | Jones et al. | 382/240 |
| 5,463,700 | 10/1995 | Nakazawa | 382/309 |

*Primary Examiner*—Leo Boudreau
*Assistant Examiner*—Phuoc Tran
*Attorney, Agent, or Firm*—Leonard A. Alkov; Wanda K. Denson-Low

[57] ABSTRACT

Integrity checking apparatus and procedures for checking safety-critical high throughput data and image transformations. The present invention randomly samples input and output data streams and uses the sampled data in either a forward or backward transformation to verify that the input data and output data are consistent. Because only a small fraction of the overall data is examined, the computational workload is very small by comparison, and processing may be more efficiently implemented. More particularly, in order to check the data, input data is transformed into output data, the output data is sampled, the input data is sampled corresponding to the sampled output data, and the input data is calculated from the output data, using forward or backward (inverse) data transformations. If the sampled input data and sampled output data correspond, then the output data is deemed to be correct. If the data does not correspond, then an error signal is generated.

1 Claim, 4 Drawing Sheets

INTEGRITY CHECKING PROCEDURE FOR HIGH THROUGHPUT DATA TRANSFORMATIONS

BACKGROUND

The present invention relates generally to image manipulation, and more particularly to integrity checking apparatus and procedures for ensuring the correctness of data transformations.

For safety-critical systems, it has been impractical, if not impossible, to monitor high throughput data transformations to be sure that they produce correct results. Such systems are therefore capable of producing hazardous situations. Also, in the past, image manipulation has been performed in an "unmonitored" manner because of the cost of required hardware.

The prior art relating to safety monitoring of safety-critical systems involved either (a) replicated hardware and software with comparison monitoring to detect errors, or (b) two computational hardware channels containing dissimilar hardware and software with comparison monitoring to detect the errors between channels. Both approaches are impractical for very high throughput applications because of the cost, power, weight, and volume of a second computational hardware channel. In addition, the first approach is ineffective at detecting software errors since both channels behave identically.

The particular application for which the present invention was developed is the display of a radar image of a runway. The image is used by a pilot of an aircraft to aid the task of landing the aircraft in extremely low visibility conditions, such as fog, for example (known as category III weather). The basic procedure of the present invention, however, is applicable to a general set of problems in which the integrity of a set of calculations must be ensured.

A radar image viewed by the pilot initially exists in range/azimuth coordinates, which is a natural result of the way a radar operates. In this coordinate system, the image is highly distorted from what a pilot would see through a windshield of the aircraft. To make an image that is conformal to the actual runway image that would be seen if there were no fog obscuring the pilot's vision, for example, the radar image must be rotated almost 90 degrees, from a horizontal plane to a nearly vertical plane. The actual amount of rotation depends on aircraft attitude and the orientation of the display on which the image is to be projected. In addition, aircraft roll attitude causes a lateral distortion of the image which must also be corrected. Also, signal processing must be performed on the intensity information contained in the radar image to ensure that bright objects are visible and that the surface of the runway appears black (clear). To perform this transformation on an image that must be refreshed at 10 frames per second, or greater, requires a significant amount of computation, and for this purpose, a special purpose signal processor was developed. Ultimately, the signal processor will be produced as a dedicated VLSI implementation for production.

Because the pilot uses the image for monitoring or lateral guidance during the final stages of the landing, errors in the image location, orientation, scaling, or in the intensity of key elements could cause a hazard, such as landing off the centerline of the runway, or striking an obstacle. An error in the image could occur due to a failure of the image processing hardware which was not detected by normal monitoring, or by an error in an algorithm (hardware or software) that performs the transformations and processing. Because of the safety-critical nature of the system, these errors must be detected with high confidence in real time, and the pilot alerted, such as by inhibiting the display if it is in error.

If the only requirement was to detect and report hardware errors or failures, it would be adequate to provide a second identical processing channel and compare the results. This is a common practice in high-integrity computing, such as is provided by Stratus computers, for example, or in many flight control systems, such as the L-1011 autopilot system, for example. Providing a second computational channel is quite expensive, not only in terms of cost, but also in terms of weight and power due to the very large computational workload imposed by the transformations (nearly a billion operations per second). In addition, providing identical processing channels and comparing results will not detect an error in the implementation or design of the transformation itself, thus leaving the system exposed to software errors. The normal means for addressing software errors is to provide dissimilar processing (different algorithms in different channels) with the expectation that if two (or more) different calculations produce similar results, then the result must be correct (known as N-version programming). It is, in this situation, just as impractical to transform the data with a different algorithm and compare results as it is to transform it with an identical algorithm. In both cases, physical and cost limitations prevent using this approach.

Accordingly, it is an objective of the present invention to provide for error detection apparatus and procedures that ensure the correctness of data transformations that are displayed or used in safety-critical systems, and the like.

SUMMARY OF THE INVENTION

In view of the above, the key to the present invention is the observation that the algorithms in question create an image, for example, and that small errors (one or two pixels) do not create hazards; rather the hazards result from displacement or corruption of all, or major parts of the image. Consequently, it is not necessary to check every output pixel to make sure it is correct. Only a sample of the output data needs to be checked, and if the sample is correct then it can be inferred that the rest of the image is also correct. This is only true in cases where there are other fault detecting features in the system so that such an inference is reasonable.

The present invention comprises integrity checking procedures for checking safety critical high throughput transformations. The present invention randomly samples input and output data streams and processes the sampled data in either a forward or backward transform to verify that the input data and output data are consistent. Because only a small fraction of the overall data is examined, the computational workload is very small by comparison to other checking schemes, and processing may thus be more efficiently implemented, such as in a relatively small processor or logic array, for example.

Furthermore, a single data error does not cause the undetected output and/or display of erroneous data. This is attributed to the fact that the forward and backward transforms are different and are performed in different computing devices, and therefore a single-point failure or design flaw will not affect both systems.

More particularly, in order to check the consistency of the data, input data is transformed into output data, the output data is sampled, a portion of the input data is sampled that corresponds to the sampled output data, and the input data is calculated from the output data, using forward or backward (inverse) data transformations. If the sampled input data and sampled output data correspond, then the output data is deemed to be correct. If the data does not correspond, then an error signal is generated.

In one reduced to practice embodiment of the present invention, a region of input data is sampled and transformed by a secondary image transformation channel to produce a single output pixel. The value of this calculated output pixel is compared to the value of a pixel generated by a primary image transformation channel. If the values differ by more than a preset amount, an error is indicated. The particular pixel to be compared is reselected randomly each time an image is generated so that errors that might affect only certain pans of the output image are also detected. Also, and in the alternative, this embodiment may be easily adapted to compare several pixels, depending upon the data that is to be tested.

The present invention thus provides for integrity checking procedures that ensure the correctness of transformed data and images, and in particular allows hardware or software errors to be detected. The present invention provides procedures for monitoring the transformation of high throughput computations using diverse hardware and software without encountering unreasonable costs.

The present invention may be employed with any hardware or software that provides for high throughput data manipulation in which redundant processing is impractical. Applications include enhanced vision, medical imaging, electronic throttle control, steer by wire, and image processing application having safety implications.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
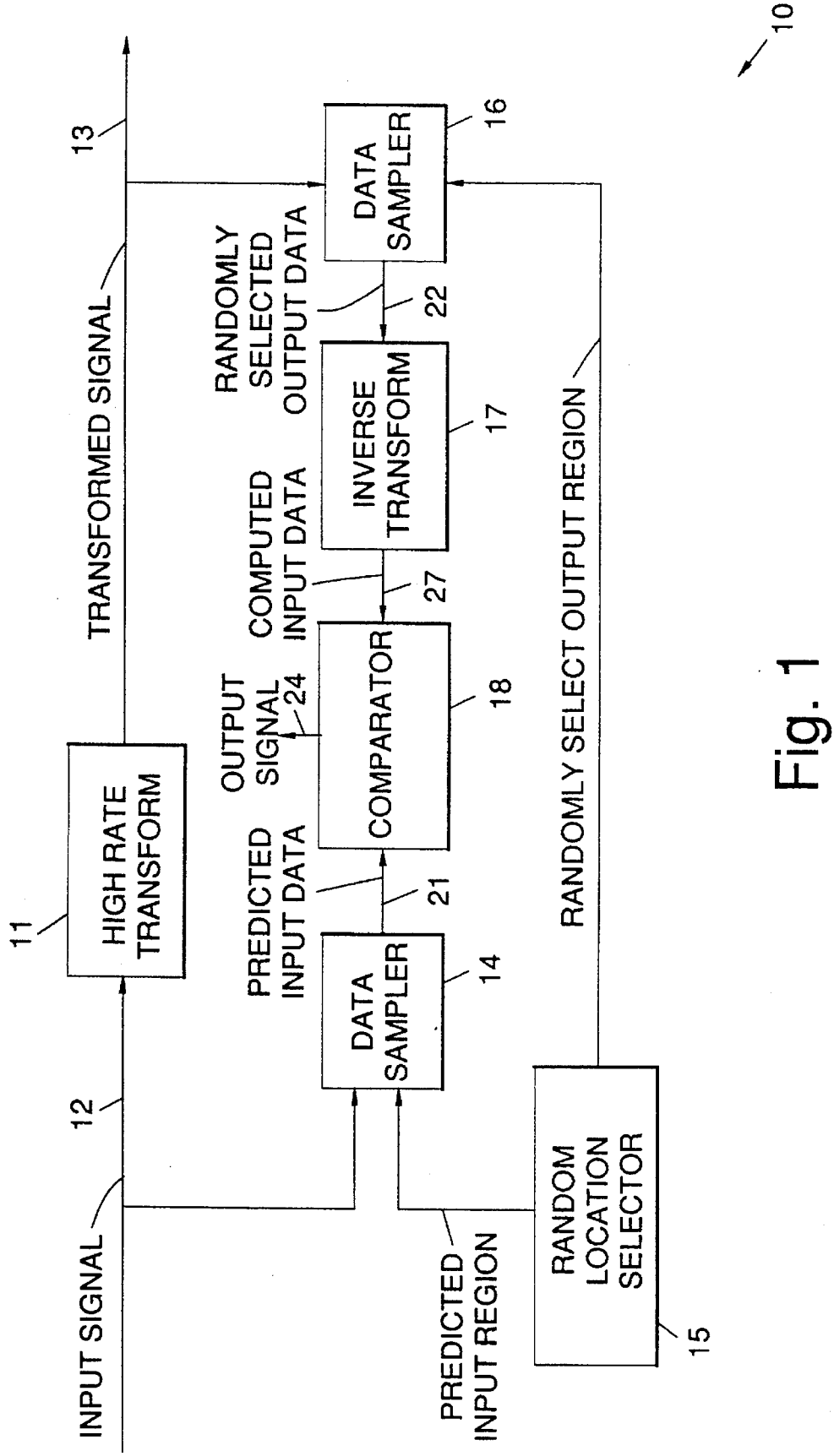
FIG. 1 illustrates an integrity checking procedure and apparatus using a backward transformation for ensuring the correctness of transformed images in accordance with the principles of the present invention.

Referring to the drawing figures, FIG. 1 illustrates an integrity checking procedure 10 (or apparatus 10) for ensuring the correctness of transformed images in accordance with the principles of the present invention. It is to be understood that the procedure 10 may be implemented in either hardware or software configuration, as the need dictates. The integrity checking procedure 10 (apparatus 10) is adapted to operate on input data 12 comprising an input signal 12 that is transformed at a relatively high computational rate by a high rate transform procedure 11 (or apparatus 11 ) to produce output data 13 comprising a transformed output signal 13.

The input data 12 is applied to a first data sampler 14. The transformed output data 13 is applied to a second data sampler 16. A random location selector 15 is coupled to the first and second data samplers 14, 16 and is adapted to randomly select a region of the output data 13 (corresponding to randomly selected output data 22) that is to be compared with a corresponding predicted input region of the input data 12 (corresponding to predicted input data 21). The first data sampler 14 outputs (samples) the predicted input data 21 contained within the predicted input region determined by the random location selector 15. The second data sampler 16 outputs (samples) the randomly selected output data 22 contained within the randomly selected output region.

The predicted input data 21 are applied to the comparator 18. The randomly selected output data 22 are applied to an inverse transform procedure 17 (or apparatus 17). The inverse transform procedure 17 (or apparatus 17) transforms the randomly selected output data 22 into corresponding computed input data 27. The transformed randomly selected output data 22 comprising the computed input data 27 is applied to the comparator 18 wherein the predicted input data 21 and the computed input data 27 are compared. If the predicted input data 21 corresponds to the computed input data 27, then the entire output data 13 is deemed to be correct, and an output signal 24 is generated indicative of that fact. Otherwise, if there is no correspondence between the data 21, 27, then an output signal 24 is generated indicative of the lack of correspondence is generated. The respective signal 24 is employed to transmit or suppress transmission of the output data, as the case may be.

Figure 2:
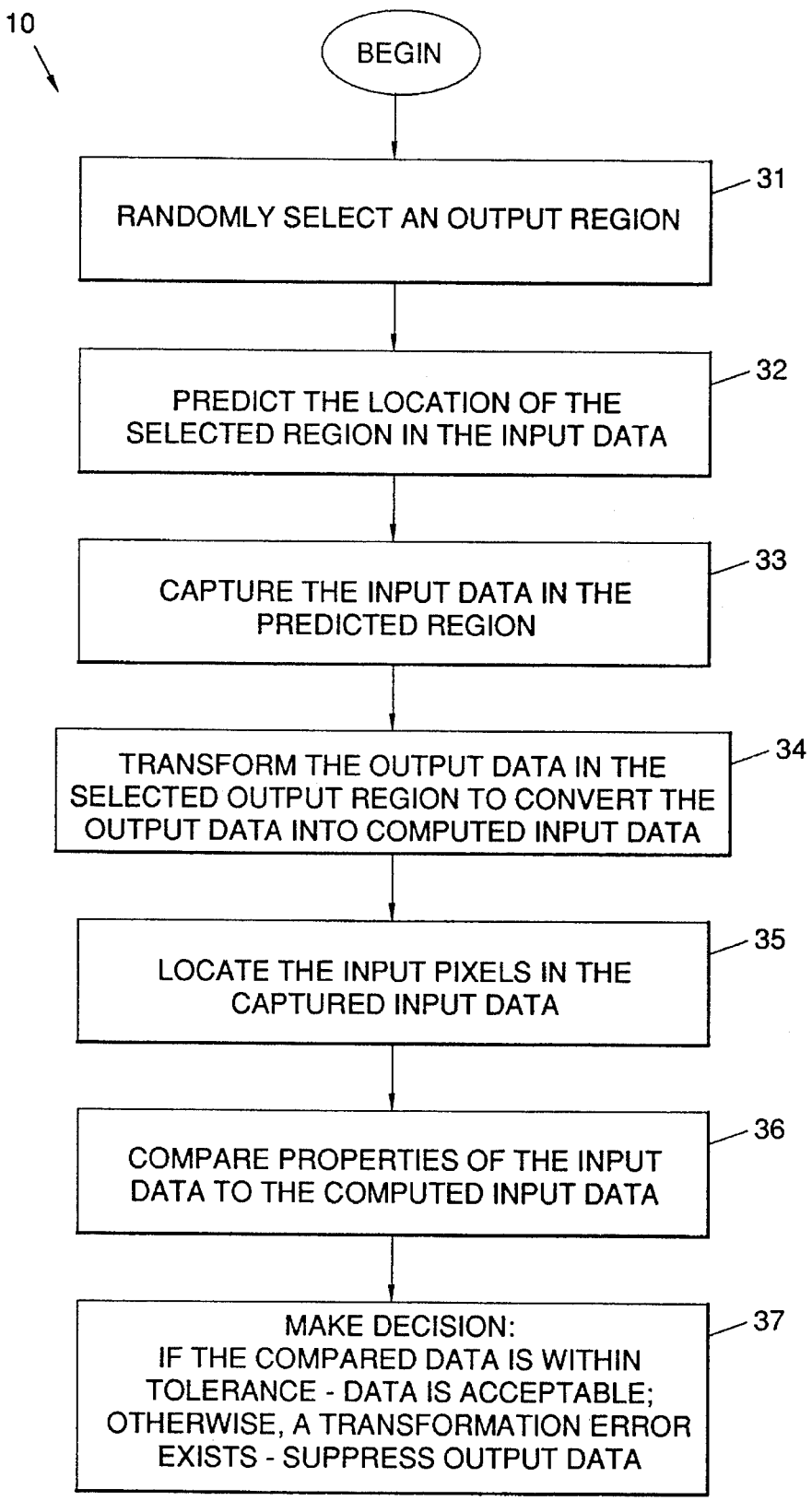
FIG. 2 is a flow diagram illustrating the integrity checking procedure in accordance with the principles of the present invention.

FIG. 2 is a flow diagram illustrating the integrity checking procedure 10 in accordance with the principles of the present invention. It is to be understood that the present apparatus 10 also functions in a like manner. In order to check the integrity of the output data 13, output pixels are selected by randomly selecting an output region in step 31. The location (input region) in the input data 12 corresponding to the selected output region is predicted in step 32. The input data 12 corresponding to the predicted input region is captured (sampled) in step 33. The input data 12 corresponding to the predicted input region is that data that could affect the selected output pixels. Then, an inverse transformation (using relevant information such as aircraft attitude and other external information, for example) is used to calculate input pixels in the input data 12 from the detected output pixels in the output data 13 in step 34. Then, the calculated input pixels are located in the captured (sampled) input data 12 in step 35. The calculated input pixels are then compared to the corresponding input pixels in the sampled input data in step 36. Then a decision is made in step 37, wherein if the calculated input pixels derived from the output data match the sampled input data 12, then the output data 13 is deemed to be correct, and an output signal 24 is generated indicative of that fact. By match it is meant that the values of the input pixels are within a preset tolerance range of the values of the output pixels. Otherwise, an output signal 24 is generated indicative of the lack of correspondence between the input data 12 and the output data 13. The appropriate output signal 24 is used to prevent the use of erroneous output data, such as by blanking a display, for example.

Figure 3:
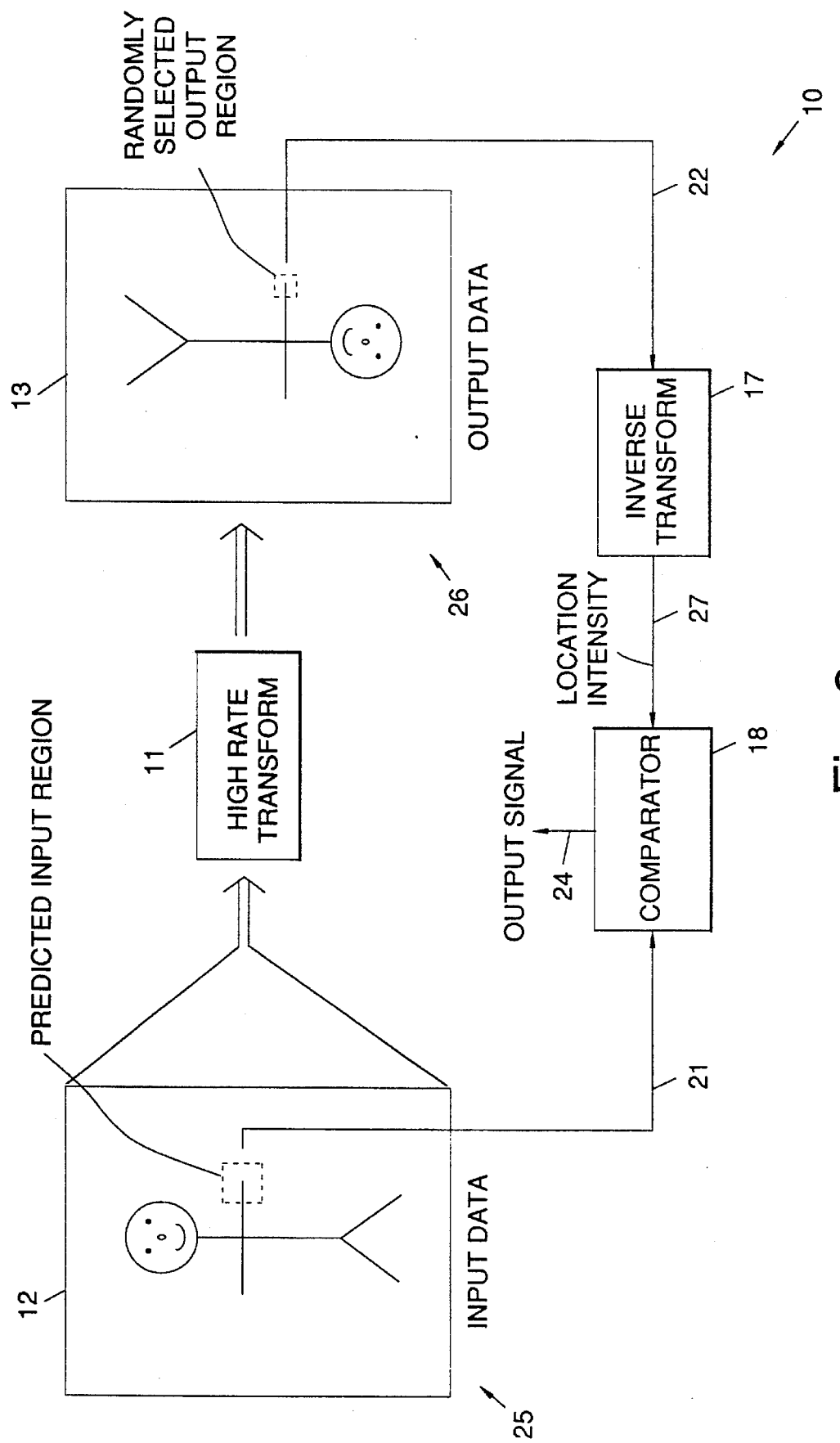
FIG. 3 shows a relatively simple transformation illustrating the use of the integrity checking procedure of the present invention.

To better illustrate the present invention, FIG. 3 shows a relatively simple transformation illustrating the use of the integrity checking procedure 10 of the present invention. In the example of FIG. 3, the transformation 11 is a 180 degree rotation of an input image 25 comprising the input data 12 to produce an inverted output image 26 corresponding to the output data 13. A point or pixel in the output image 26 is randomly selected (the output data 22), and a corresponding region (predicted input region) in the input image 25 which could produce that point or pixel is captured from the input data 13. Then transformation 11 produces the output image 26 comprising the output data 13. When the output image 26 is complete, or at least when the selected output pixel in the output region has been created, the exact input pixel corresponding to the selected output pixel is calculated (backwards, by means of the inverse transform 17), which produces a calculated intensity value, for example, for the input pixel (calculated input data 27), and the intensity value of the input pixel (predicted input data 21) is compared to the intensity value of the transformed output pixel (computed input data 27). If the two compared intensity values are within a preset tolerance range (representing acceptable performance) then the output image 26 is acceptable.

The actual transformations used in the aircraft landing system described above are significantly more complex than in this example, and the intensity value of an output pixel is a function of many input pixels, but the above example illustrates the principle. In addition, when detecting scaling and rotation errors, more than one pixel in the output data 13 must be processed, and that the pixels in the output data 13 must be relatively far apart.

Figure 4:
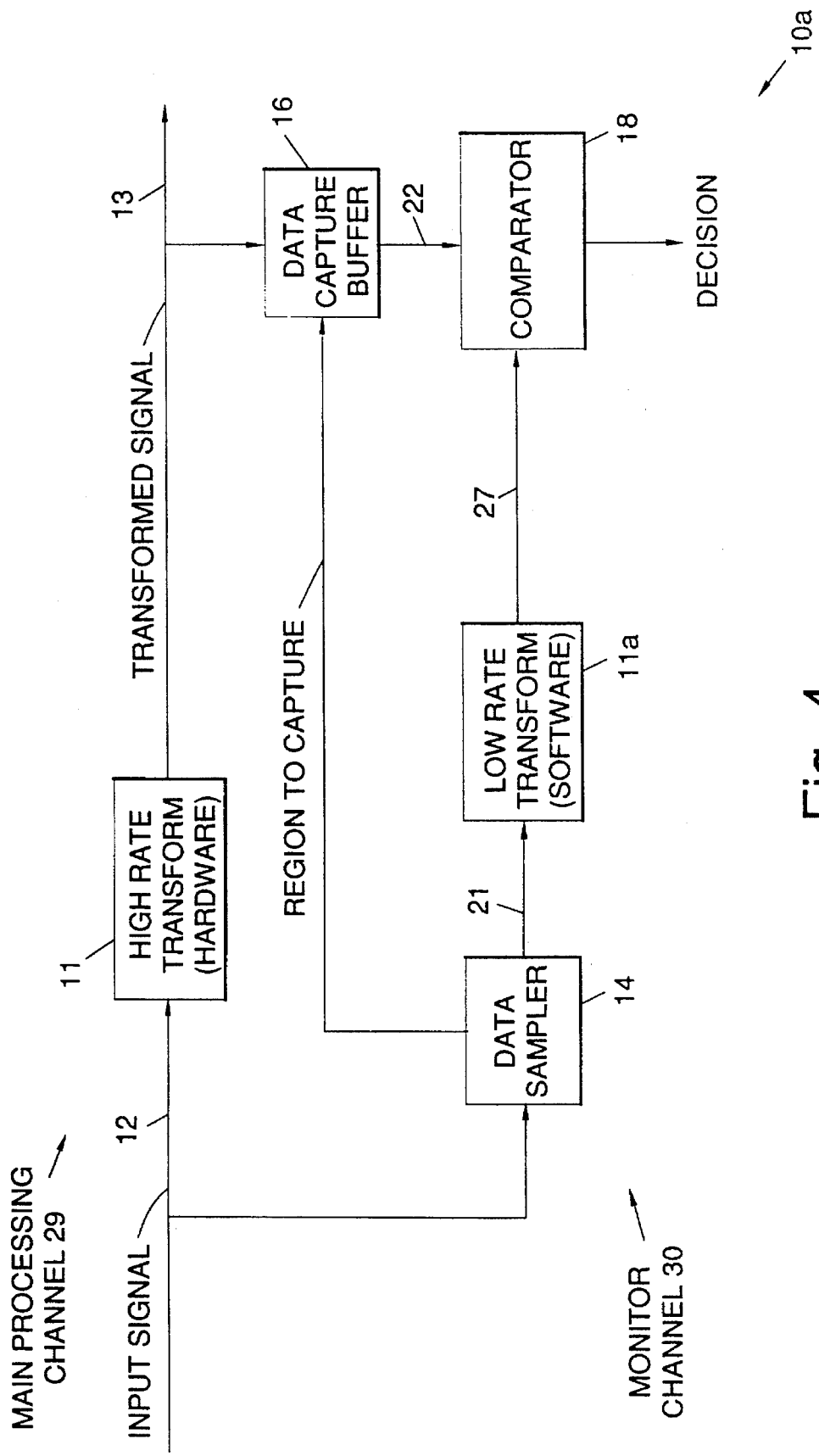
FIG. 4 illustrates an alternative implementation of an integrity checking procedure and apparatus using a forward transformation in accordance with the principles of the present invention.

FIG. 4 illustrates an alternative implementation of an integrity checking procedure 10a in accordance with the present invention, based on a forward transformation 11a. The integrity checking procedure 10a uses sampled data for monitoring. In FIG. 4, a monitor channel 30 and main processing channel 29 both use forward transformations 11, 11a, and the comparison is done on captured output data 13. Whether a forward or backwards transformation 11a, 17 is used for the monitoring channel 30 is a design decision that is based on the relative complexity of the two transformations 11, 11a. If the main high rate transform 11 is implemented in a VLSI circuit, for example, the forward transform 11a is implemented in software and provides sufficient dissimilarity to detect errors, and may be used in lieu of the inverse transformation 17 if the inverse transformation 17 is significantly more complex.

By way of summary, the present invention thus provides for integrity checking procedures 10, 10a for checking safety-critical high-throughput data and image transformations 11. The present invention randomly samples input and output data streams and process the sampled data in either a forward or backward transform 11a, 17 to verify that the input data and output data are consistent. Because only a small fraction of the overall data is examined, the computational workload is very small by comparison to other schemes, and processing may thus be implemented in a much smaller processor or logic array, for example. In order to check the output data, an output pixel is detected, input data is sampled which could affect that output pixel, and then the input data is calculated from the output data, using a (forward or backward) data transformation. If the calculated input data derived from the output data match the sampled input data, then the output data is deemed to be correct. If the data does not match, then an error signal is generated.

In one application of the present invention relating to vision, and head-up displays in particular, regions of the input data are sampled and the corresponding region of the output data is converted by way of the inverse transform 17 to produce a single input pixel. The value of this calculated input pixel is compared to the value of the appropriate sampled input pixel. If the values differ by more than a preset amount, an error is indicated. The particular pixels to be compared is reselected randomly each time the image is generated so that errors that might affect only certain parts of the output image are also detected.

If a primary processing channel is comprised of hardware, a software monitor channel as described above provides dissimilarity and thus the ability to detect hardware and software errors. If the primary processing channel is comprised of software, the monitor channel (alone) provides dissimilar redundancy if the output data is used to calculate an input data set that is compared to the sampled input data, or if a different method is used to calculate the output data in the monitor channel than in the primary processing channel.

The present invention was developed for use in a system that, in part, performs a complex image transformation. An incorrect output from the system may cause injury or death. The present invention allows hardware or software errors to be detected, and thus provides a safety mechanism that helps to reduce hazards resulting from such errors. The present invention may be employed with any hardware or software that provides for high throughput data manipulation in which redundant processing is impractical. Applications include enhanced vision, medical imaging, electronic throttle control, steer by wire, and image processing application having safety implications.

Thus there has been described a new and improved integrity checking apparatus and procedures for ensuring the correctness of data transformations. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Integrity checking apparatus for ensuring the correctness of transformed image data comprising:

first transform means for transforming input imagery data into transformed output imagery data;

first sampling means for sampling an input region of the input imagery data to provide sampled input imagery data;

second transform ;means for transforming the sampled input imagery data into transformed input imagery data;

second sampling means for sampling output imagery data in an output region of the transformed output imagery data that corresponds to the sampled input region of the input imagery data to provide sampled output imagery data;

random location selector means coupled to the first and second data sampling means adapted to randomly select a region of the output imagery data which is compared with a corresponding predicted input region of the input imagery data;

comparitor means for comparing the transformed input imagery data to the sampled output imagery data, and for generating an output signal indicative of the correspondence between the transformed input imagery data and the sampled input imagery data.

* * * * *